Oct. 9, 1928.
F. J. JAEGER
1,687,337
BUMPER FOR MOTOR VEHICLES
Filed March 16, 1928
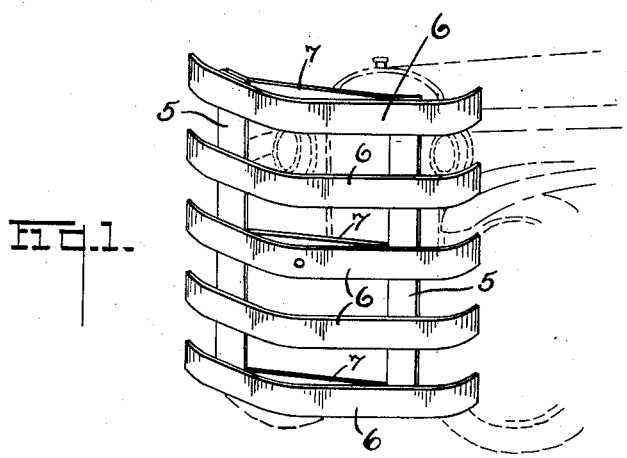
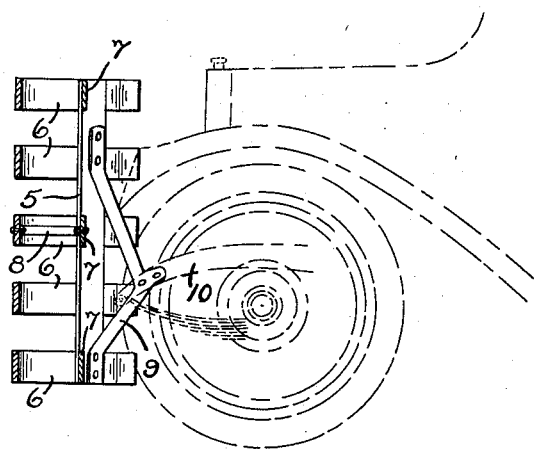
Inventor
Frank J. Jaeger
By Owen & Owen
Attorneys Patented Oct. 9, 1928.

1,687,337

UNITED STATES PATENT OFFICE.

FRANK J. JAEGER, OF TOLEDO, OHIO.

BUMPER FOR MOTOR VEHICLES.

Application filed March 16, 1928. Serial No. 262,147.

This invention relates to a bumper which is adapted primarily to be attached to the front end of a motor vehicle or the like and which is constructed with the object of providing a proper safeguard, whereby a person struck by the moving vehicle will be thrown to one side, entirely clear of the vehicle instead of being thrown against the radiator or crushed underneath the wheels or the chassis.

The specific construction of the invention, in its preferred form, and the advantages resulting therefrom will be more particularly described in connection with the accompanying drawings, in which:—

Figure 1 is a perspective view of the invention in operative position.

Fig. 2 is a central longitudinal section of the same.

As illustrated in the drawings, the invention comprises a plurality of uprights 5 to which a series of spaced transverse front bars 6 are rigidly secured. Each of these bars is of steel or similar material and is curved sharply at its center, extending rearwardly and laterally in each direction therefrom, its end portions being curved so as to extend more directly toward the rear. The uprights 5 are also rigidly connected to each other by a plurality of transverse struts 7 in rear of the bars 6. This structure may be further braced by one or more longitudinal struts 8 secured at the ends to the central portions of corresponding members 6 and 7. Supporting brackets 9 are provided for securing the bumper to the front end of a motor vehicle or the like. Each bracket 9 is approximately in the shape of a V with its apex secured to a part of the chassis, indicated at 10, and the extremities of its legs are secured to one of the uprights 5, as shown in Fig. 2.

It will be noted that the area embraced by the series of front bars extends entirely across the front of the vehicle from side to side thereof and extends in a vertical direction substantially from the top of the radiator nearly to the ground. By reason of this construction and the position in which the bumper is carried, any person or object which should happen to be in front of the vehicle will be cast to one side beyond the path of the wheels, instead of being run over or being thrown against the radiator or hood. The rearwardly curved end portions of the bars 6 further aid in brushing aside any person or object that may happen to be caught in front of one of the wheels. The entire structure is well braced, so that it may not be easily bent out of shape by any object which may be encountered. It serves as a protection to the radiator, motor and wheels of the vehicle as well as to persons or animals that may be struck.

While I have shown and described in considerable detail the preferred form of the invention, it is to be understood that this construction may be modified to a considerable extent without departing from the spirit and the scope of the invention as claimed.

What I claim is:

1. A bumper for vehicles, comprising a plurality of uprights, curved front bars connecting said uprights, rectilinear struts connecting said uprights in rear of said front bars, and supporting brackets which are approximately V-shaped with their apexes secured to the vehicle and the ends of their arms secured to the uprights near the upper and lower ends thereof respectively.

2. A bumper of the character described, comprising a plurality of uprights, curved front bars connecting said uprights, transverse struts connecting said uprights in rear of said front bars, and at least one longitudinal strut extending from the center of one of the transverse struts to the center of one of the front bars.

3. A bumper for vehicles, comprising a plurality of uprights, struts connecting the same, a plurality of like front bars connecting said uprights, each front bar being sharply curved at its center and extending rearwardly and outwardly therefrom toward opposite sides of the vehicle, and means for supporting said bumper in front of the vehicle.

4. A bumper for vehicles, comprising a plurality of uprights, a plurality of like front bars connecting said uprights, each front bar being sharply curved at its center and extending rearwardly and outwardly therefrom toward opposite sides of the vehicle, the end portions of said bars being curved to extend more directly toward the rear, transverse struts connecting said uprights, and at least one longitudinal strut extending from the center of one of the transverse struts to the center of one of the front bars.

In testimony whereof, I have hereunto signed my name to this specification.

FRANK J. JAEGER.